J. H. JERRIM.
MACHINE OR OTHER VISE.
APPLICATION FILED JUNE 26, 1919.

1,349,963.

Patented Aug. 17, 1920.

Inventor:
James Henry Jerrim

UNITED STATES PATENT OFFICE.

JAMES HENRY JERRIM, OF BROMSGROVE, ENGLAND.

MACHINE OR OTHER VISE.

1,349,963.  Specification of Letters Patent.  Patented Aug. 17, 1920.

Application filed June 26, 1919. Serial No. 306,971.

*To all whom it may concern:*

Be it known that I, JAMES HENRY JERRIM, subject of the King of Great Britain, residing at the Oaklands, Bromsgrove, Worcester, England, have invented certain new and useful Improvements in Machines or other Vises, of which the following is a specification.

The invention refers to machine or other vises and like work holding or setting appliances or the type in which the jaws comprise adjustable elements. An object of the present improvements is a simple and efficient construction of the adjustable elements of the jaws and a simple and effective lock for securing the elements in adjusted position.

Figure 1:
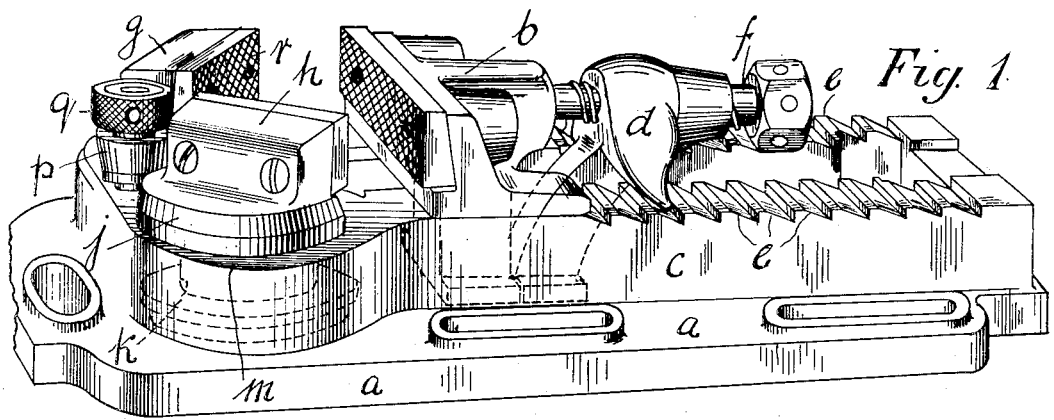
Figure 1 is a perspective view of the improved machine vise.
Figure 2:
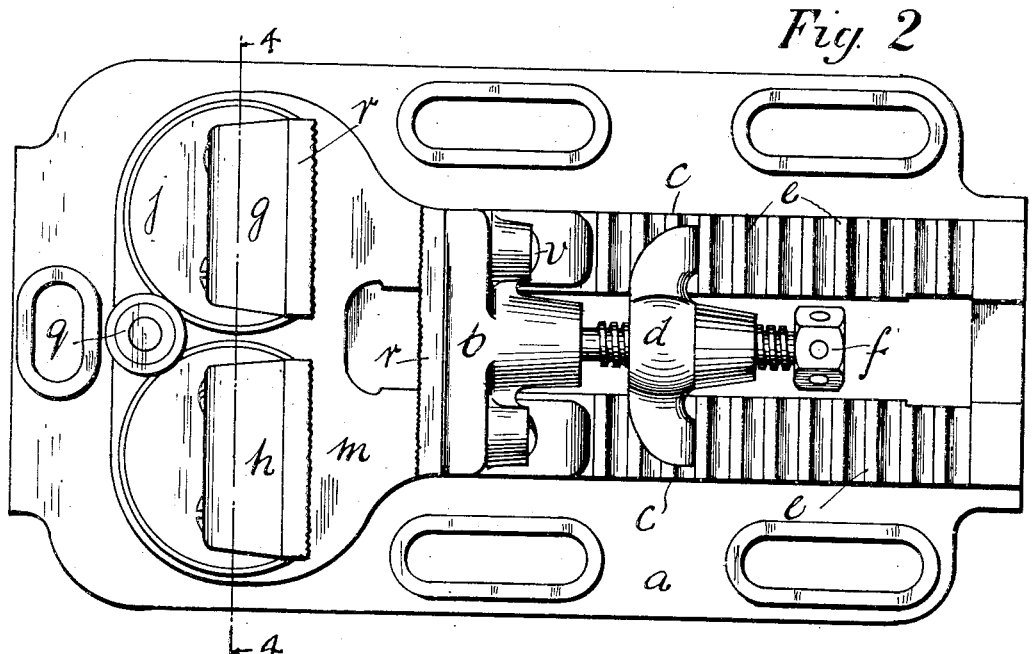
Fig. 2 is a plan thereof.
Figure 3:
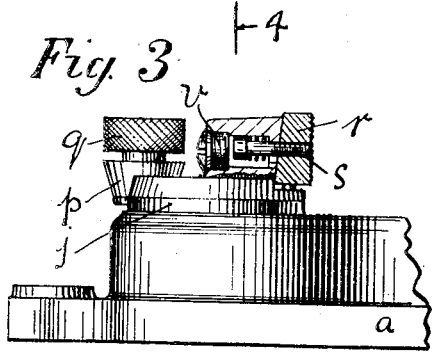
Fig. 3 is an elevation of the left hand portion of Fig. 1 with one of the adjustable jaw elements shown in section.
Figure 4:
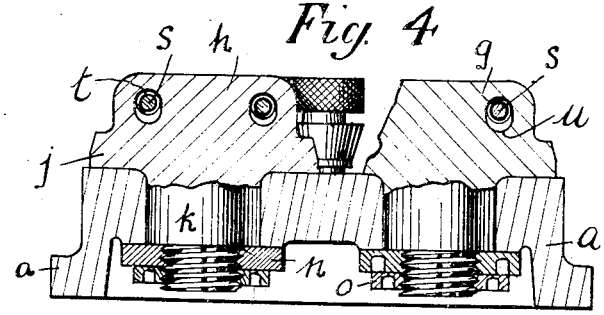
Fig. 4 is a cross section on line 4—4 of Fig. 2 looking toward the left and with one element partly broken away.

In the illustrated embodiment $a$ is the casting or body and $b$ the movable jaw which slides on the raised portions $c$ of the body and is rapidly adjustable by the claw or pawl $d$ on the rack teeth $e$ and closely adjustable by the screw $f$ passing through the claw or pawl. So far the device follows on lines well known in the art. The other jaw of the vise is comprised of two pivotal elements $g$ and $h$ each having a collar or boss $j$ and a stud or pin $k$ received in apertures in the raised portion or platform $m$ of the body. Part of the stud or pin is plain so that each element $g$ and $h$ may be pivoted in the body while the extremity of each pin is screw threaded and has a threaded washer $n$ and lock nut $o$ screwed thereon. The washer and nut are set so that frictional engagement with the underside of the platform $m$ prevents too free movements of the element $g$ or $h$ but intended adjustment is permitted. Each element $g$ and $h$ has a beveled or conical surface on its collar or boss and in the space between the two elements a stud or pillar is secured, and on this stud a conical clamping member $p$ is arranged and is adapted to be forced into engagement with the beveled surfaces of both elements by a clamping nut $q$ working in a screw thread on the end of the stud.

The elements $g$ and $h$ may thus be set so that their gripping faces are at any desired angle to each other and they may be locked in this position by turning the clamping nut $q$.

The gripping parts of the elements $g$ and $h$ and of the movable jaw $b$, may have a beveled face on which corresponding jaw plates $r$ are secured, so that under pressure the plates tend to close down slightly and thus counteract the usual tendency of the work to rise or squeeze out of the jaws if it is of a curved or irregular contour. The jaw plates $r$ may be secured by screws $s$ with springs $t$ around the screws so that the plate is held by spring pressure, and the screws pass through slots $u$ permitting movement to take place with the above object. The space in the jaw for the screws $s$ to work in may be closed by plugs $v$ to prevent the entry of dust, swarf, or the like.

What I claim is:—

1. In vises and work holding appliances, in combination with a body and a jaw thereon, a plurality of pivotal gripping elements opposite said jaw, said elements being adjustable around their pivots, and a clamping means disposed between said elements to engage same and simultaneously lock them in adjusted position.

2. In vises and work holding appliances, the combination of a body, a jaw movable thereon, a plurality of pivotal elements opposite said jaw, said elements being adjustable in relation to each other and said jaw, said elements each having a concentric bevel surface, and a conical clamping means disposed between said elements in a position to engage said bevel surfaces and simultaneously lock said elements in adjusted position.

3. In vises and work holding appliances, the combination of a body, a jaw movable thereon, a platform on said body, a pair of elements on vertical pivots in said platform, said elements being independently adjustable about said pivots, a rigid collar on each element, said collar having a conical face, a conical stud between said elements for simultaneously engaging said collars and locking both elements in adjusted position.

4. A machine vise comprising in combination a body, a platform thereon, a movable jaw, means for rapidly setting said jaw in relation to said body, means for finely adjusting said jaw, a pair of elements mounted on said platform on pivots parallel to the said jaw, gripping faces on said elements and said jaw, a conical collar on each element and a conical clamping member between said elements located so as to engage the conical collar of each.

5. A machine vise comprising in combination a body, a platform thereon, a movable jaw, means for rapidly setting said jaw in relation to said body, means for finely adjusting said jaw, a pair of elements mounted on said platform on pivots parallel to the said jaw, gripping faces on said elements and said jaw, said faces each having an inclined surface engaging an incline on the jaw or the element as the case may be, screws in said faces passing through slots in said jaw or element, springs around said screws to draw said faces against the element or jaw, a conical collar on each element and a conical clamping member between said elements located so as to engage the conical collar of each.

In testimony whereof I affix my signature.

JAMES HENRY JERRIM.